(12) United States Patent
Kwon et al.

(10) Patent No.: US 9,331,754 B2
(45) Date of Patent: May 3, 2016

(54) COMMUNICATION DEVICE AND METHOD FOR GENERATING BEAMFORMING LINK

(75) Inventors: Hyuk-choon Kwon, Seoul (KR); Soo-yeon Jung, Seoul (KR); Ho-dong Kim, Seoul (KR); Hae-young Jun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 560 days.

(21) Appl. No.: 13/478,878

(22) Filed: May 23, 2012

(65) Prior Publication Data

US 2013/0115887 A1 May 9, 2013

(30) Foreign Application Priority Data

Nov. 9, 2011 (KR) ........................ 10-2011-0116474

(51) Int. Cl.
*H04B 1/00* (2006.01)
*H04B 15/00* (2006.01)
*H04B 7/04* (2006.01)
*H04B 7/24* (2006.01)
*H04B 7/06* (2006.01)

(52) U.S. Cl.
CPC .............. *H04B 7/0408* (2013.01); *H04B 7/061* (2013.01); *H04B 7/0695* (2013.01)

(58) Field of Classification Search
CPC .. H04B 7/0617; H04B 7/0619; H04B 7/0491; H04B 7/061
USPC .................................................. 455/63.4, 69
See application file for complete search history.

(56) References Cited

U.S. PATENT DOCUMENTS

| | | | |
|---|---|---|---|
| 7,570,210 B1* | 8/2009 | Nabar et al. .................. 342/373 |
| 2008/0207270 A1* | 8/2008 | Na ....................... H04B 7/0617 455/562.1 |
| 2009/0323847 A1* | 12/2009 | Na et al. ........................ 375/267 |
| 2011/0080898 A1* | 4/2011 | Cordeiro .............. H04B 7/0617 370/338 |

* cited by examiner

*Primary Examiner* — Ayodeji Ayotunde
(74) *Attorney, Agent, or Firm* — Sughrue Mion, PLLC

(57) ABSTRACT

A communication device which generates a beamforming link between the communication device and an external device is provided. The communication device includes: a beamforming link generating unit which generates a first beamforming link between a first antenna of a plurality of antennas of the communication device and the external device, and which generates a second beamforming link between a second antenna of the plurality of antennas of the communication device and the external device; and a transmission unit which transmits data to the external device via each of the first beamforming link and the second beamforming link.

15 Claims, 9 Drawing Sheets

COMMUNICATION DEVICE AND METHOD FOR GENERATING BEAMFORMING LINK

CROSS-REFERENCE TO RELATED PATENT APPLICATION

This application claims priority from Korean Patent Application No. 10-2011-0116474, filed on Nov. 9, 2011, in the Korean Intellectual Property Office, the disclosure of which is incorporated herein by reference in its entirety.

BACKGROUND

1. Field

Apparatuses and methods consistent with exemplary embodiments relate to a communication device and a method for generating a beamforming link.

2. Description of the Related Art

Technological progress relating to wireless networks and a corresponding increase in demand for bulk multimedia data transmission have provided an impetus for research relating to an effective transmission method in a wireless network environment. Furthermore, wireless transmission of high-quality video, such as Digital Video Disk (DVD) images and High Definition Television (HDTV) images, between various home devices is increasing.

Recently, technology relating to transmitting a large amount of data in a wireless home network has been developed. In particular, this technology, referred to as Millimeter Wave (mmWave), uses a 60 GHz band of an electronic wave for which a physical wavelength is generally measured in millimeters (i.e., an electronic wave having a frequency within the range of 30 GHz to 300 GHz) to transmit a large amount of data. In the past, this frequency range has been used to a limited extent by communication providers, for electronic wave astrology, and for vehicle anti-collision applications, because it is an unlicensed band. The 60 GHz band has a channel bandwidth of 2.16 GHz in the standard. Thus, mmWave has a much greater carrier frequency and channel bandwidth than other frequency bands. Accordingly, the use of a millimeter-wave signal having a wavelength measured in millimeter units creates the possibility of a very high data rate, on the order of several-Gbps, and a possibility of an implementation of a single chip which includes an antenna having a size which is 1.5 mm or less.

In particular, research has recently been conducted into transmission of non-compressed audio or video data (hereinafter, non-compressed data) between wireless devices by using a relatively high bandwidth within the millimeter wave range. Compressed data may be compressed in a lossy way, by, for example, removing portions less sensitive to human visual or auditory sense by using processes such as motion compensation, Discrete Cosine Transform (DCT), quantization, and variable length coding, while non-compressed data may include, for example, digital values (e.g., R, G, and B components) which indicate respective states of pixel components.

FIG. 1 is a schematic configuration diagram of a wireless network system which includes a wireless network coordinator 10 and wireless network stations 20.

The wireless network coordinator 10 adjusts a bandwidth allocation for each of the wireless network stations 20 in a wireless network by transmitting a beacon frame. In particular, one or more wireless network stations 20 forming the wireless network refer to the received beacon frame, thereby waiting to be allocated a bandwidth, or transmitting data to another station through an allocated bandwidth when the bandwidth is allocated thereto. The wireless network is formed based on a beacon interval which includes at least one Data Transfer Time (DTT), which may be classified into a scheduled Service Period (SP), i.e., a time period scheduled to allocate a bandwidth to a specific wireless network station 20 in the wireless network, and a Contention-Based Access Period (CBAP), i.e., a time period which is bandwidth-allocated to one wireless network station 20 that selected through contention from among wireless network stations 20 in the wireless network. The DTT indicates a predetermined time period during which data is transmitted and received between the wireless network stations 20 in the wireless network. A wireless network station 20 may transmit data during a CBAP by winning contention against other wireless network stations 20, or may transmit data during an SP allocated thereto.

In accordance with the mmWave technology, which enables data to be transmitted with a channel bandwidth of 2.16 GHz by using a carrier frequency of 60 GHz, directional communication may be required. In particular, data communication may be achieved by arranging antennas included in a transmission station and a reception station to face each other, and in this case, it is preferable to perform beamforming for synchronizing a direction of an electronic wave.

It may be understood that a purpose of the beamforming is to adjust directions of electronic waves transmitted and received by antennas included in a transmission station and a reception station so that the electronic wave directions match each other, in order for data to be smoothly transmitted and received in a high frequency band.

Conventionally, in a beamforming operation between a transmission station and a reception station, each having a plurality of antennas, a beamforming link may be generated for any respective pair of the respective pluralities of antennas of each of the transmission station and the reception station.

In particular, because the beamforming link is generated for only one of the plurality of antennas of each of the transmission station and the reception station, the other antennas of the transmission station and the reception station cannot be used in a practical manner.

SUMMARY

Exemplary embodiments provide a communication device and a method for generating a beamforming link to enhance a communication performance between the communication device and an external device by generating another beamforming link in addition to a first beamforming link generated between the two devices.

Exemplary embodiments also provide a communication device and a method for generating a beamforming link to enhance a communication performance between the communication device and an external device without performing a beam refinement phase.

According to an aspect of one or more exemplary embodiments, there is provided a communication device for generating a beamforming link between the communication device and an external device. The communication device includes: a beamforming link generating unit which generates a first beamforming link between a first antenna of a plurality of antennas of the communication device and the external device, and which is able to generate a second beamforming link between a second antenna of the plurality of antennas of the communication device and the external device; and a transmission/reception unit which transmits data to the external device via each of the first beamforming link and the second beamforming link, and which is able to receive data.

The communication device may further include a communication performance determining unit which determines a first performance indicator which indicates a communication performance relating to the first beamforming link, wherein the beamforming link generating unit determines, based on the determined first performance indicator, whether the second beamforming link is generated or not.

When the second beamforming link is generated, the transmission/reception unit may transmit first data to the external device via the first beamforming link and transmit second data to the external device via the second beamforming link.

If the transmission/reception unit receives a beamforming link generation request from the external device, the beamforming link generating unit may generate the second beamforming link.

When the second beamforming link is generated, the communication performance determining unit may determine a second performance indicator which indicates a communication performance relating to the second beamforming link, and if a value of the second performance indicator is lower than a pre-set reference value, the transmission/reception unit may not use the second beamforming link.

The transmission/reception unit may include: a frame transmitting unit which transmits a sweep frame to the external device via each of a plurality of sectors, wherein each of the plurality of sectors corresponds to a respective one of the plurality of antennas; and a frame receiving unit which receives a feedback frame from the external device. When the second beamforming link is generated, the beamforming link generating unit may determine the first antenna and one of the plurality of sectors which corresponds to the first antenna and the second antenna and one of the plurality of sectors which corresponds to the second antenna based on information relating to the received feedback frame, generate the first beamforming link using the determined first antenna and the determined sector corresponding to the first antenna, and generate the second beamforming link using the determined second antenna and the determined sector corresponding to the second antenna.

The feedback frame may include: an antenna Identification field which indicates an identification of an antenna through which the sweep frame received by the external device has been transmitted; and a sector identification field which indicates an identification of a sector through which the sweep frame has been transmitted.

The feedback frame may further include information relating to a relative priority of the feedback frame with respect to other feedback frames transmitted to the communication device, and the beamforming link generator may determine the first antenna and the sector corresponding to the first antenna based on feedback frame information which indicates a first priority, and the beamforming link generator may determine the second antenna and the sector corresponding to the second antenna based on feedback frame information which indicates a second priority.

The feedback frame may further include information relating to a signal-to-noise ratio which corresponds to a reception of the sweep frame received by the external device, and the beamforming link generator may determine the first antenna, the sector corresponding to the first antenna, the second antenna, and the sector corresponding to the second antenna based on the information relating to the signal-to-noise ratio included in the feedback frame.

The transmission/reception unit may include: a frame transmitting unit which transmits a sweep frame to the external device via each of a plurality of sectors, wherein each of the plurality of antennas except for the first antenna corresponds to at least one of the plurality of sectors; and a frame receiving unit which receives a feedback frame from the external device. When the second beamforming link is generated, the beamforming link generating unit may determine the second antenna and one of the plurality of sectors which corresponds to the second antenna based on information relating to the received feedback frame, and generate the second beamforming link using the determined second antenna and the determined sector corresponding to the second antenna.

According to another aspect of one or more exemplary embodiments, there is provided a method for generating a beamforming link between a communication device and an external device by using the communication device, the method including: (a) generating a first beamforming link between a first antenna of a plurality of antennas of the communication device and the external device; (b) generating a second beamforming link between a second antenna of the plurality of antennas of the communication device and the external device; and (c) transmitting data to the external device via each of the first beamforming link and the second beamforming link.

The transmitting data to the external device may include transmitting first data to the external device via the first beamforming link and transmitting second data to the external device via the second beamforming link.

The method may further include receiving a beamforming link generation request from the external device.

The generating of the first beamforming link and the second beamforming link may include: transmitting a sweep frame to the external device via each of a plurality of sectors, wherein each of the plurality of sectors corresponds to a respective one of the plurality of antennas; receiving a feedback frame from the external device; determining the first antenna and one of the plurality of sectors which corresponds to the first antenna and the second antenna and one of the plurality of sectors which corresponds to the second antenna based on information relating to the received feedback frame; and generating the first beamforming link using the determined first antenna and the determined sector corresponding to the first antenna and generating the second beamforming link using the determined second antenna and the determined sector corresponding to the second antenna.

The feedback frame may include: an antenna Identification field which indicates an identification of an antenna through which the sweep frame received by the external device has been transmitted; and a sector identification field which indicates an identification of a sector through which the sweep frame has been transmitted.

The feedback frame may further include information relating to a relative priority of the feedback frame with respect to other feedback frames transmitted to the communication device. The method may further include determining the first antenna and the sector corresponding to the first antenna based on feedback frame information which indicates a first priority, and determining the second antenna and the sector corresponding to the second antenna based on feedback frame information which indicates a second priority.

The feedback frame may further include information relating to a signal-to-noise ratio which corresponds to a reception of the sweep frame by the external device. The method may further include determining the first antenna, the sector corresponding to the first antenna, the second antenna, and the sector corresponding to the second antenna based on the information relating to the signal-to-noise ratio included in the feedback frame.

The generating of the second beamforming link may include: transmitting a sweep frame to the external device via each of a plurality of sectors, wherein each of the plurality of antennas except for the first antenna corresponds to at least one of the plurality of sectors; receiving a feedback frame from the external device; determining the second antenna and one of the plurality of sectors which corresponds to the second antenna based on information relating to the received feedback frame; and generating the second beamforming link using the determined second antenna and the determined sector corresponding to the second antenna.

In another aspect according to one or more exemplary embodiments, there is provided a method for generating a beamforming link between a communication device and an external device by using the communication device. The method includes: generating a first beamforming link between a first antenna of a plurality of antennas of the communication device and the external device; determining a first performance indicator which indicates a communication performance relating to the first beamforming link; using the determined first performance indicator to determine whether to generate a second beamforming link; generating the second beamforming link between a second antenna of the plurality of antennas of the communication device and the external device if a positive determination to generate the second beamforming link is made; and transmitting data to the external device via at least one of the first beamforming link and the second beamforming link.

When the second beamforming link is generated, the method may further include determining a second performance indicator which indicates a communication performance relating to the second beamforming link, and if a value of the second performance indicator is lower than a pre-set reference value, not using the second beamforming link to transmit data.

In another aspect according to one or more exemplary embodiments, there is provided a non-transitory computer-readable recording medium which stores a computer-readable program for executing any one of the methods described above.

BRIEF DESCRIPTION OF THE DRAWINGS

The above and other features and advantages of the present inventive concept will become more apparent by describing in detail exemplary embodiments thereof with reference to the attached drawings in which.

DETAILED DESCRIPTION OF THE EXEMPLARY EMBODIMENTS

Expressions such as "at least one of," when preceding a list of elements, modify the entire list of elements and do not modify the individual elements of the list.

Advantages, features, and methods for achieving them will be clear with reference to the exemplary embodiments described below in detail together with the accompanying drawings. However, the present inventive concept is not limited to the exemplary embodiments disclosed below and may be implemented in various different forms, wherein the exemplary embodiments are only provided to fully inform those of ordinary skill in the art of the scope of the present inventive concept; instead, the present inventive concept is just defined by the scope of claims. Like reference numbers are used to refer to like elements throughout the specification.

The term "unit," as used in the detailed description of the exemplary embodiments, refers to a software component or a hardware component such as a Field Programmable Gate Array (FPGA) or an Application-Specific Integrated Circuit (ASIC), which component performs a corresponding role. However, the term "unit" is not limited to software or hardware. For example, the term "unit" may refer to a configuration which is included in a storage medium capable of addressing or reproducing one or more processors. Therefore, the term "unit" includes, for example, components, such as software components, object-oriented software components, class components, and task components, processes, functions, attributes, procedures, subroutines, program code segments, drivers, firmware, microcode, a circuit, data, a database, data structures, tables, arrays, and variables. A function provided in components and "units" may be combined into a smaller number of components and/or "units," or further divided into additional components and/or "units."

Figure 1:
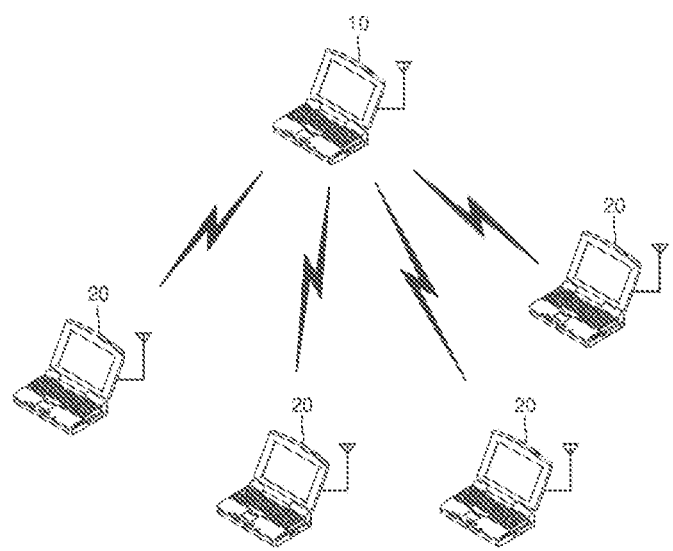
FIG. 1 is a schematic configuration diagram which illustrates a wireless network system.
Figure 2A:
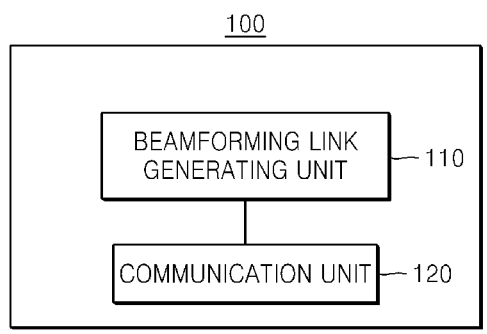
FIG. 2A is a block diagram which illustrates a communication device according to an exemplary embodiment.
Figure 2B:
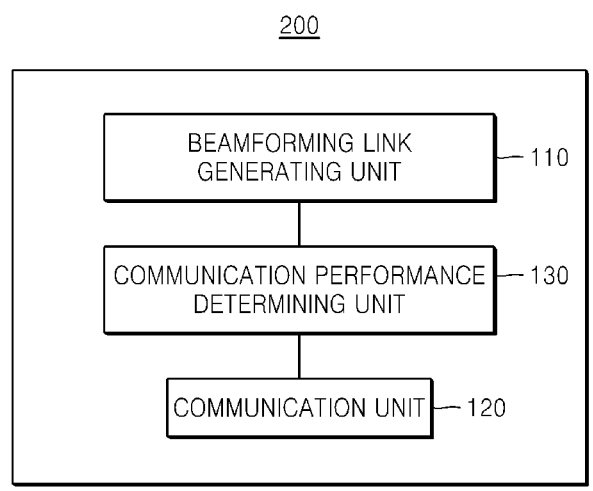
FIG. 2B is a block diagram which illustrates a communication device according to another exemplary embodiment.

FIG. 2A is a block diagram which illustrates a communication device 100 according to an exemplary embodiment, and FIG. 2B is a block diagram which illustrates a communication device 200 according to another exemplary embodiment.

Referring to FIGS. 2A and 2B, the communication device 100 may include a beamforming link generating unit 110 and a communication unit 120, and compared with the communication device 100, the communication device 200 may further include a communication performance determining unit 130. The communication unit 120 may also be referred to herein as a "transmission/reception unit."

Each of the communication devices 100 and 200 may include, for example, a network coordinator or a station included in a wireless network.

The beamforming link generating unit 110 generates a first beamforming link between a first antenna of a plurality of antennas of the communication device 100 or 200 and an external device. In addition, the beamforming link generating unit 110 generates, or is able to generate, a second beamforming link between a second antenna of the plurality of antennas of the communication device 100 or 200 and the external device.

Although it is described herein that the beamforming link generating unit 110 generates the first beamforming link and the second beamforming link, it will be understood by those of ordinary skill in the art that the beamforming link generating unit 110 may generate additional beamforming links.

When the communication device 100 or 200 communicates as a network coordinator with a station that serves as the external device, the first beamforming link is generated between the first antenna of the plurality of antennas in the network coordinator and the station, and the second beamforming link is generated between the second antenna of the plurality of antennas in the network coordinator and the station.

The transmission/reception unit 120 transmits data from the communication device 100 or 200 to the external device via each of the first beamforming link and the second beamforming link.

In at least one exemplary embodiment, the transmission/reception unit 120 may transmit the data through the first beamforming link and the second beamforming link at the same time. Accordingly, communication efficiency between the communication device 100 or 200 and the external device may increase.

In at least one exemplary embodiment, when the communication device 100 or 200 has first data and second data to be transmitted to the external device, the transmission/reception unit 120 may transmit the first data through the first beamforming link and the second data through the second beamforming link. Accordingly, two or more different types of data may be transmitted at the same time. For example, an Audio and Video (AV) stream may be transmitted through the first beamforming link, and a control frame may be transmitted through the second beamforming link.

The transmission/reception unit 120 may determine whether the external device has a plurality of antennas by receiving a device capability frame from the external device before the beamforming link generating unit 110 generates the second beamforming link, and if the external device has a plurality of antennas, the beamforming link generating unit 110 may generate the second beamforming link.

The communication performance determining unit 130 may determine a communication performance of at least one of the first beamforming link and the second beamforming link. In particular, the communication performance determining unit may determine a first performance indicator which indicates a communication performance relating to the first beamforming link and/or a second performance indicator which indicates a communication performance relating to the second beamforming link. The communication performance determining indicator is configured to determine a respective performance indicator which indicates a respective communication performance relating to a corresponding beamforming link.

The communication performance indicator may include, for example, at least one of a bit rate and a link margin of a beamforming link.

If a value of a communication performance indicator relating to the first beamforming link is lower than a pre-set reference value, the beamforming link generating unit 110 may selectively generate the second beamforming link.

If the transmission/reception unit 120 receives a beamforming link generation request from the external device, the beamforming link generating unit 110 may generate the second beamforming link. If the transmission/reception unit 120 receives additional beamforming link generation requests from the external device, the beamforming link generating unit 100 may generate respective additional beamforming links.

If a value of a communication performance indicator relating to the second beamforming link is lower than the pre-set reference value based on the communication performance of the second beamforming link generated between the communication device 100 or 200 and the external device, the transmission/reception unit 120 may not use the second beamforming link.

Figure 3:
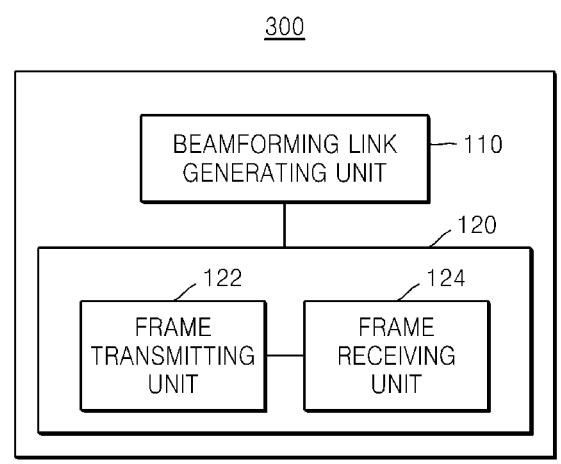
FIG. 3 is a block diagram which illustrates a communication device according to yet another exemplary embodiment.

FIG. 3 is a block diagram which illustrates a communication device 300 according to another exemplary embodiment.

Referring to FIG. 3, the transmission/reception unit 120 may include a frame transmitting unit 122 and a frame receiving unit 124.

Figure 5A:
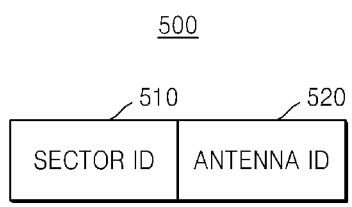
FIG. 5A is an illustration of a configuration of a sweep frame used by a communication device, according to an exemplary embodiment.
Figure 5B:
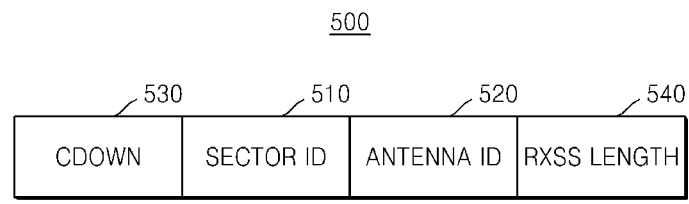
FIG. 5B is an illustration of a configuration of a sweep frame used by a communication device, according to another exemplary embodiment.

Referring also to FIG. 5A and FIG. 5B, the frame transmitting unit 122 transmits a sweep frame 500 to an external device via a respective one of a plurality of sectors, wherein each of the plurality of sectors corresponds to a respective one of a plurality of antennas of the communication device 300.

When the communication device 300 operates as a network coordinator, information included in the sweep frame 500 may be contained in a beacon and transmitted to the external device.

Figure 6A:
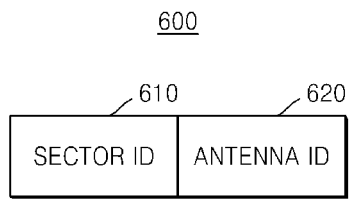
FIG. 6A is an illustration of a configuration of a feedback frame used by a communication device, according to an exemplary embodiment.
Figure 6B:
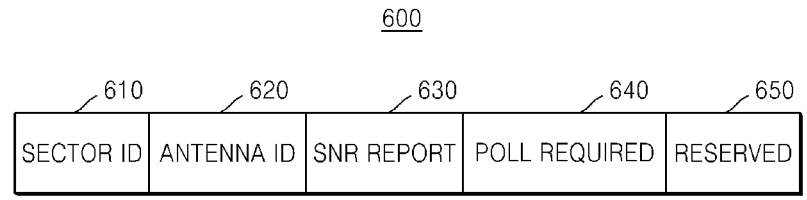
FIG. 6B is an illustration of a configuration of a feedback frame used by a communication device, according to another exemplary embodiment.

Referring also to FIG. 6A and FIG. 6B, the frame receiving unit 124 receives a feedback frame 600 from the frame receiving unit 124 as a response to the sweep frame 500.

Each of the plurality of sectors is associated with a respective one of the plurality of antennas of the communication device 300, and the frame transmitting unit 122 transmits the sweep frame 500 on a sector-related basis.

For example, when the communication device 300 includes first, second, third, and fourth antennas, each of which includes 64 sectors, the frame transmitting unit 122 may transmit a respective sweep frame 500 to the external device via each of the 256 sectors; i.e., a first sweep frame 500 is transmitted via a first sector of the first antenna, a second sweep frame 500 is transmitted via a second sector of the first antenna, and so on, continuing to a $256^{th}$ sweep frame 500 is transmitted via a $64^{th}$ sector of the fourth antenna.

When a first beamforming link has been already generated between the first antenna of the communication device 300 and the external device, the frame transmitting unit 122 may transmit a sweep frame 500 to the external device via each of a plurality of sectors which correspond to remaining antennas by excluding the first antenna from the plurality of antennas. This is because two beamforming links cannot be generated at a single antenna.

The beamforming link generating unit 110 determines the first antenna and a respective one of the plurality of sectors which corresponds to the first antenna for generating the first beamforming link, and determines a second antenna and a respective one of a plurality of sectors which corresponds to the second antenna for generating a second beamforming link.

Figure 4:
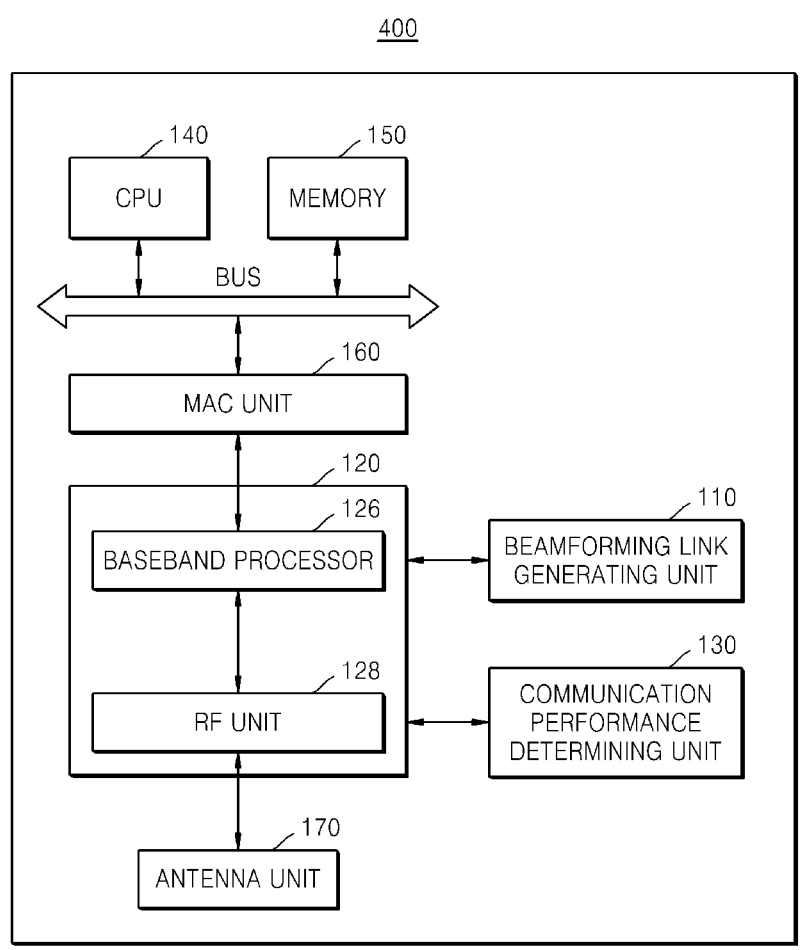
FIG. 4 is a block diagram which illustrates a communication device according to still another exemplary embodiment.

FIG. 4 is a block diagram which illustrates a communication device 400 according to another exemplary embodiment.

Referring to FIG. 4, the communication device 400 includes the beamforming link generating unit 110, the transmission/reception unit 120, the communication performance determining unit 130, a central processing unit (CPU) 140, a memory 150, a bus, a Media Access Control (MAC) unit 160, and an antenna unit 170.

The CPU 140 controls the other components, which are connected to the CPU 140 via the bus. The CPU 140 processes received data, such as, for example, received MAC Service Data Unit (MSDU), which is provided from the MAC unit 160, or generates data to be transmitted and provides the generated data (e.g., MSDU data) to the MAC unit 160.

The memory 150 stores data. The memory 150 is a module capable of inputting and outputting information, such as, for example, a hard disk, a flash memory, a Compact Flash (CF) card, a Secure Digital (SD) card, a Smart Media (SM) card, a Multimedia Card (MMC), or a memory stick, and may be included in a station (such as, for example, the communication device 400) or a separate device. When the memory 150 is included in a separate device, the transmission/reception unit 120 communicates with the separate device to transmit and receive data.

The MAC unit 160 generates a MAC Protocol Data Unit (MPDU) by adding a MAC header to an MSDU, i.e., data to be transmitted, which has been provided from the CPU 140. The communication device 400 may include two or more MAC units 160. In this case, different MPDUs may be generated at the same time.

The transmission/reception unit 120 converts the MPDU generated by the MAC unit 160 into a wireless signal and transmits the wireless signal via a communication channel. To do this, the transmission/reception unit 120 includes a baseband processor 126 and a radio frequency (RF) unit 128 and is connected to the antenna unit 170. The antenna unit 170 includes at least one antenna, or a plurality of antennas.

As described above, the transmission/reception unit 120 may further include the frame transmitting unit 122 for transmitting sweep frames 500 to an external device and a frame receiving unit 124 for receiving a feedback frame 600 from the external device.

The baseband processor 126 receives the MPDU generated by the MAC unit 160, and adds a signal field and a preamble to generate a Presentation Protocol Data Unit (PPDU). Then, the RF unit 128 converts the generated PPDU into a wireless signal and transmits the wireless signal via the antenna unit 170.

FIG. 5A is a configuration of a sweep frame 500 used by a communication device, according to an exemplary embodiment, and FIG. 5B is a configuration of a sweep frame 500 used by a communication device, according to another exemplary embodiment.

Referring to FIG. 5A, the sweep frame 500 includes a sector Identification (ID) field 510 and an antenna ID field 520.

The antenna ID field 520 indicates an ID of an antenna through which the sweep frame 500 is transmitted. An external device may determine the one of a plurality of antennas of the communication device through which the sweep frame 500 has been transmitted.

The sector ID field 510 indicates an identification of the one of a plurality of sectors which corresponds to a respective one of the plurality of antennas in the communication device and through which the sweep frame 500 is transmitted.

Referring to FIG. 5B, the sweep frame 500 may further include a CDOWN field 530 and an RXSS length field 540.

The CDOWN field 530 indicates the number of sweep frames 500 that have not yet been transmitted from among all sweep frames 500 which are intended to be transmitted from the communication device to an external device.

The RXSS length field 540 is a reserved field which includes information relating to when the sweep frame 500 is transmitted in a Contention-Based Access Period (CBAP).

FIG. 6A is a configuration of a feedback frame 600 used by a communication device, according to an exemplary embodiment, and FIG. 6B is a configuration of a feedback frame 600 used by a communication device, according to another exemplary embodiment.

Referring to FIG. 6A, the feedback frame 600 includes a sector ID field 610 and an antenna ID field 620.

The sector ID field 610 indicates an ID of the sector through which the sweep frame 500 received by an external device has been transmitted.

The antenna ID field 620 indicates an ID of the one of a plurality of antennas of the communication device through which the sweep frame 500 has been transmitted.

Referring to FIG. 6B, the feedback frame 600 may further include a Signal to Noise Ratio (SNR) Report field 630, a Poll Required field 640, and a Reserved field 650.

The SNR Report field 630 includes information relating to a signal-to-noise ratio which corresponds to a reception of a sweep frame 500 received by an external device.

The Poll Required field 640 includes information which indicates that a network coordinator is needed to initialize communication with a device that is not the network coordinator.

The Reserved field 650 is reserved for a specific usage in the future.

The feedback frame 600 may include information relating to an antenna and a sector through which a sweep frame 500 corresponding to the best transmission efficiency from among a plurality of sweep frames 500 received from the communication device is transmitted. The transmission efficiency may be determined based on the intensity of a received signal or an SNR of the sweep frame 500.

Alternatively, the feedback frame 600 may include a plurality of antenna ID fields 620 and a plurality of sector ID fields 610, and may further include transmission efficiency information relating to a sweep frame 500 corresponding to each of the plurality of antenna ID fields 620 and the plurality of sector ID fields 610. In this case, although the external device transmits only one feedback frame 600, the beamforming link generating unit 110 may generate a plurality of beamforming links based on the information included in the feedback frame 600.

In accordance with another exemplary embodiment, the communication device may transmit a plurality of feedback frames 600. In this case, each of the plurality of feedback frames 600 may include information relating to a relative priority of the respective feedback frame with respect to the others of the plurality of feedback frames 600 transmitted to the communication device. The priority may be defined, for example, based on a transmission efficiency of a respective sweep frame 500 received by the external device.

The beamforming link generating unit 110 may determine antennas and sectors for generating a first beamforming link and a second beamforming link. In particular, the beamforming link generating unit 110 may determine a first antenna and one of a plurality of sectors which corresponds to the first antenna for generating the first beamforming link by referring to an antenna ID field 620 and a sector ID field 610 included in a feedback frame 600 having a first priority, and may also determine a second antenna and one of a plurality of sectors which corresponds to the second antenna for generating the second beamforming link by referring to an antenna ID field 620 and a sector ID field 610 included in a feedback frame 600 having a second priority.

In this case, the first beamforming link may be a link having the best communication capability, and the second beamforming link may be a link having the second best communication capability, as indicated by a respective performance indicator determined by the communication performance determining unit 130.

When the external device transmits a plurality of feedback frames 600 to the communication device, the beamforming link generating unit 110 may determine a first antenna and one of a plurality of sectors which corresponds to the first antenna for generating the first beamforming link by referring to an antenna ID field 620 and a sector ID field 610 included in a feedback frame 600 having the highest signal-to-noise ratio from among the SNR Report fields 630 included in the plurality of feedback frames 600, and may determine a second antenna and one of a plurality of sectors which corresponds to the second antenna for generating the second beamforming link by referring to an antenna ID field 620 and a sector ID field 610 included in a feedback frame 600 having the second highest signal-to-noise ratio from among the SNR Report fields 630 included in the plurality of feedback frames 600.

In this case, the first beamforming link may also be a link having the best communication capability, and the second beamforming link may also be a link having the second best communication capability.

When the first beamforming link is a link having the best communication capability, the transmission/reception unit 120 may transmit a relatively large amount of AV stream data via the first beamforming link and may transmit a relatively small amount of control frame data via the second beamforming link.

It may be understood by those of ordinary skill in the art that more feedback frames 600 can be considered for a purpose of generating additional beamforming links, in addition to the first beamforming link and the second beamforming link.

Figure 7:
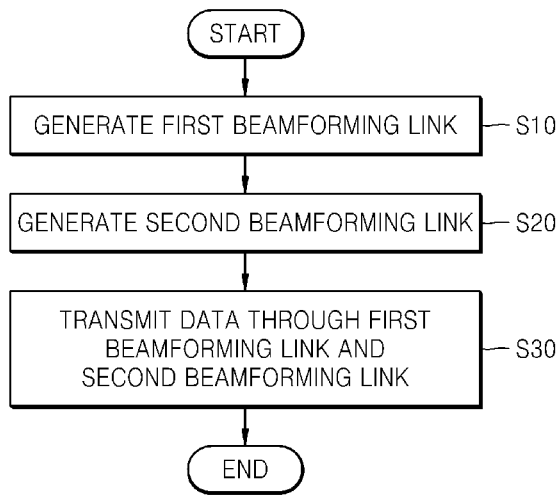
FIG. 7 is a flowchart illustrating a method for generating a beamforming link, according to an exemplary embodiment.

FIG. 7 is a flowchart illustrating a method for generating a beamforming link, according to an exemplary embodiment.

Referring to FIG. 7, in operation S10, the beamforming link generating unit 110 generates a first beamforming link between a first antenna from among a plurality of antennas of a communication device and an external device.

In operation S20, the beamforming link generating unit 110 generates a second beamforming link between a second antenna from among the plurality of antennas of the communication device and the external device.

In operation S30, the transmission/reception unit 120 transmits data to the external device via each of the generated first and second beamforming links.

The transmission/reception unit 120 may transmit the same data via each of the generated first and second beamforming links, or may respectively transmit first data and second data via the generated first and second beamforming links.

Figure 8:
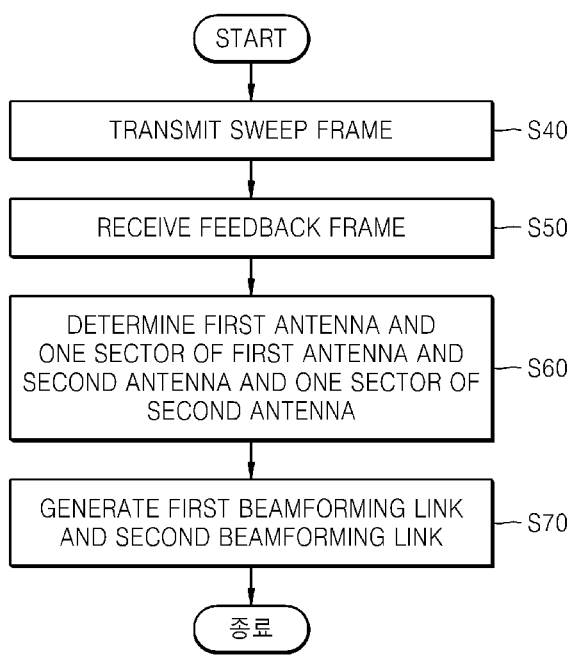
FIG. 8 is a flowchart illustrating a process of generating a first beamforming link and a second beamforming link in a method for generating a beamforming link, according to an exemplary embodiment.

FIG. 8 is a flowchart illustrating a process of generating a first beamforming link and a second beamforming link in a method for generating a beamforming link, according to an exemplary embodiment.

Referring to FIG. 8, in operation S40, the frame transmitting unit 122 of the transmission/reception unit 120 transmits sweep frames 500 to an external device via a respective plurality of sectors set for each of a plurality of antennas of a communication device.

In operation S50, the frame receiving unit 124 of the transmission/reception unit 120 receives at least two feedback frames 600 from the external device.

As described above, each feedback frame 600 includes information relating to a sector ID and an antenna ID, and may further include information relating to a relative priority of the feedback frame 600 or an SNR relating to the reception of the respective sweep frame 500.

In operation S60, the beamforming link generating unit 110 determines a first antenna and one of a plurality of sectors which corresponds to the first antenna and a second antenna and one of a plurality of sectors which corresponds to the second antenna based on information relating to the at least two received feedback frames 600.

The beamforming link generating unit 110 may determine a first antenna and one of a plurality of sectors which corresponds to the first antenna based on information relating to a sector ID and an antenna ID included in a feedback frame 600 having a first priority, and may determine a second antenna and one of a plurality of sectors which corresponds to the second antenna based on information relating to a sector ID and an antenna ID included in a feedback frame 600 having a second priority, by referring to priority information included in each of the at least two feedback frames 600.

Alternatively, the beamforming link generating unit 110 may determine a first antenna and one of a plurality of sectors which corresponds to the first antenna and a second antenna and one of a plurality of sectors which corresponds to the second antenna based on SNR information included in each of the at least two feedback frames 600.

In operation S70, the beamforming link generating unit 110 generates a first beamforming link at the determined first antenna and the determined sector corresponding to the first antenna, and generates a second beamforming link at the determined second antenna and the determined sector corresponding to the second antenna.

According to the current exemplary embodiment, based on the frame transmitting unit 122 transmitting a sweep frame 500 for each sector which corresponds to each of the plurality of antennas only once, the beamforming link generating unit 110 may generate a plurality of beamforming links.

Figure 9:
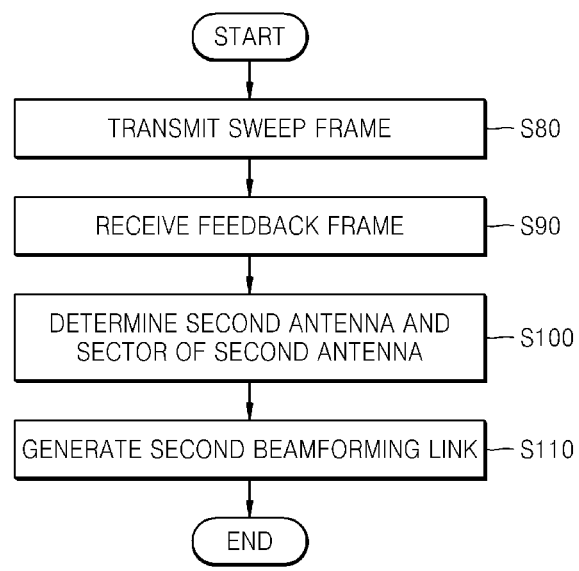
FIG. 9 is a flowchart illustrating a process of generating a second beamforming link in a method for generating a beamforming link, according to another exemplary embodiment.

FIG. 9 is a flowchart illustrating a process of generating a second beamforming link in a method for generating a beamforming link, according to another exemplary embodiment.

When the beamforming link generating unit 110 has already generated a first beamforming link between a first antenna of a plurality of antennas in a communication device and an external device, the frame transmitting unit 122 transmits a sweep frame 500 to the external device through each of a plurality of sectors which correspond to each of the remaining antennas by excluding the first antenna from among the plurality of antennas in operation S80. The exclusion of the first antenna results from the fact that two beamforming links cannot be generated at a single antenna.

In operation S90, the frame receiving unit 124 receives a feedback frame 600 from the external device.

The feedback frame 600 may include an antenna ID field 520 which indicates an ID of an antenna through which a sweep frame 500 having the best transmission efficiency from among sweep frames 500 received by the external device is transmitted, and a sector ID field 510 which indicates an ID of a sector through which the sweep frame 500 is transmitted.

In operation S100, the beamforming link generating unit 110 determines a second antenna of the plurality of antennas in the communication device and one of a plurality of sectors which corresponds to the second antenna based on information relating to the feedback frame 600.

When a single feedback frame 600 is transmitted from the external device, the beamforming link generating unit 110 may determine a second antenna and a single sector which corresponds to the second antenna by referring to a sector ID and an antenna ID included in the feedback frame 600.

When two or more feedback frames 600 are transmitted from the external device, the beamforming link generating unit 110 may determine a second antenna and a single sector which corresponds to the second antenna by referring to an SNR Report field 630 or priority information included in each of the feedback frames 600.

In operation S110, the beamforming link generating unit 110 generates a second beamforming link at the determined second antenna and the determined sector corresponding to the second antenna.

Although the second beamforming link is generated in addition to the already-generated first beamforming link in the current exemplary embodiment, additional beamforming links may be generated to augment the first beamforming link and the second beamforming link.

Figure 10:
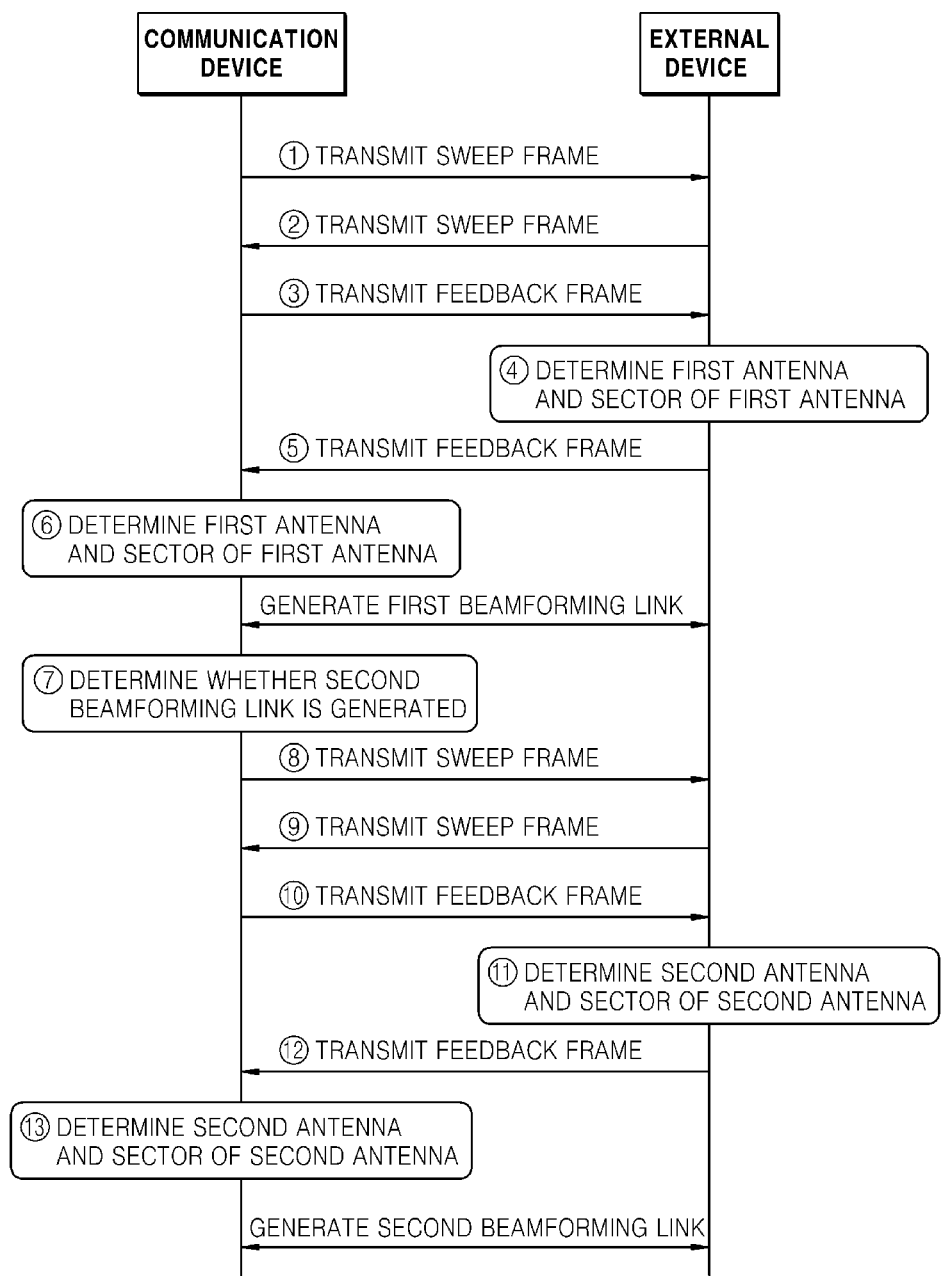
FIG. 10 is a signaling diagram illustrating a method for generating a beamforming link, according to an exemplary embodiment.

FIG. 10 is a signaling diagram illustrating a method for generating a beamforming link, according to an exemplary embodiment.

Referring to FIG. 10, ① a communication device transmits a sweep frame 500 to an external device, and ② the external device also transmits a sweep frame 500 to the communication device. ③ The communication device transmits a feedback frame 600 to the external device in response to the sweep frame 500 received from the external device, and ④ the external device determines a first antenna of a plurality of antennas in the external device and a single sector of the first antenna based on information relating to the feedback frame 600 received from the communication device. ⑤ The external device transmits a feedback frame 600 to the communication device in response to the sweep frame 500 received from the communication device. ⑥ The communication device determines a first antenna of a plurality of antennas in the communication device and a single sector of the first antenna based on information relating to the feedback frame 600 received from the external device. Accordingly, a first beamforming link may be generated between the respective determined first antennas and the respective determined sectors of the respective first antennas of each of the communication device and the external device.

Although not shown in FIG. 10, a respective device capability frame may be transmitted and received between the communication device and the external device. The respective device capability frame may include information relating to how many antennas are included in each respective device and how many sectors correspond to each antenna, and if it is determined that each of the communication device and the external device includes a plurality of antennas, an additional beamforming link may be generated.

⑦ The communication device determines, based on a communication performance of the first beamforming link, whether a second beamforming link has been generated. If it is determined that the second beamforming link has been generated, the communication device may transmit a frame for requesting generation of an additional beamforming link to the external device. ⑧ The communication device transmits a sweep frame 500 to the external device via each of the remaining antennas based on excluding the respective first antenna from among the plurality of antennas of the communication device, and ⑨ the external device also transmits a sweep frame 500 to the communication device via each of the remaining antennas based on excluding the respective first antenna from among the plurality of antennas of the external device. ⑩ The communication device transmits a feedback frame 600 to the external device in response to the sweep frame 500 received from the external device, and ⑪ the external device determines a respective second antenna of the plurality of antennas of the external device and a single sector which corresponds to the respective second antenna based on information relating to the feedback frame 600 received from the communication device. ⑫ The external device transmits a feedback frame 600 to the communication device in response to the sweep frame 500 received from the communication device, and ⑬ the communication device determines a respective second antenna of the plurality of antennas of the communication device and a single sector which corresponds to the second antenna based on information relating to the feedback frame 600 received from the external device. Accordingly, the second beamforming link may be generated between the communication device and the external device by using the determined respective second antennas and the determined respective sectors corresponding to the respective second antennas.

Figure 11:
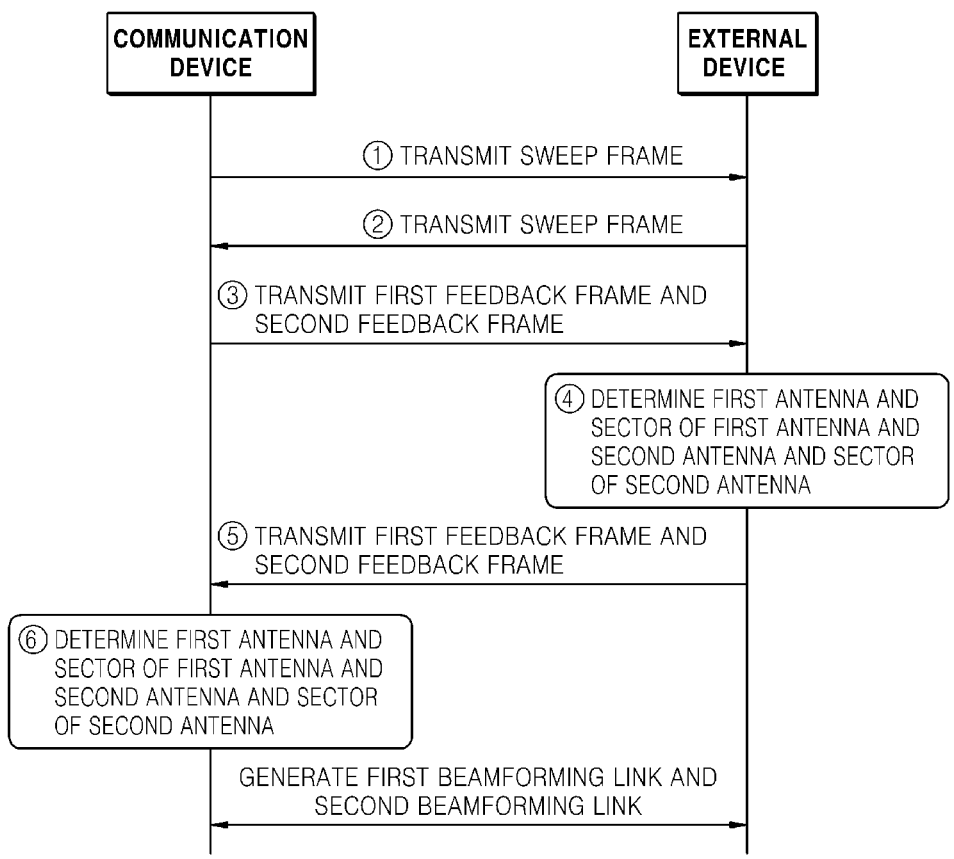
FIG. 11 is a signaling diagram illustrating a method for generating a beamforming link, according to another exemplary embodiment.

FIG. 11 is a signaling diagram illustrating a method for generating a beamforming link, according to another exemplary embodiment.

Referring to FIG. 11, ① a communication device transmits a sweep frame 500 to an external device via each of a plurality of antennas of the communication device, and ② the external device also transmits a sweep frame 500 to the communication device via each of a plurality of antennas of the external device. Although not shown in FIG. 11, a respective device capability frame may be transmitted and received between the communication device and the external device as described above. ③ The communication device transmits a first feedback frame 600 and a second feedback frame 600 to the external device in response to the sweep frame 500 received from the external device. ④ The external device determines a respective first antenna thereof and a single sector which corresponds to the first antenna and a respective second antenna thereof and a single sector which corresponds to the second antenna based on information relating to the first feedback frame 600 and the second feedback frame 600 received from the communication device. ⑤ The external device also transmits a first feedback frame 600 and a second feedback frame 600 to the communication device in response to the sweep frame 500 received from the communication device. ⑥ The communication device determines a respective first antenna thereof and a single sector which corresponds to the first antenna and a second antenna thereof and a single sector which corresponds to the second antenna based on information relating to the first feedback frame 600 and the second feedback frame 600 received from the external device. Accordingly, a first beamforming link may be generated between the determined first antenna of the communication device and the determined sector corresponding to the first antenna of the communication device and the determined first antenna of the external device and the determined sector corresponding to the first antenna of the external device, and a second beamforming link may be generated between the determined second antenna of the communication device and the determined sector corresponding to the second antenna of the communication device and the determined second antenna of the external device and the determined sector corresponding to the second antenna of the external device.

The exemplary embodiments can be encoded as computer programs and can be implemented in general-use digital computers that execute the programs using a computer-readable recording medium, including a non-transitory computer-readable recording medium. Examples of the computer-readable recording medium may include magnetic storage media (e.g., read-only memory (ROM), floppy disks, hard disks, etc.), optical recording media (e.g., compact disk-ROM (CD-ROMs), or digital versatile disks (DVDs)), and storage media such as carrier waves (e.g., transmission through the Internet).

The communication device and method for generating a beamforming link, according to an exemplary embodiment, may increase a communication performance between the communication device and an external device by generating another beamforming link in addition to an existing beamforming link which had previously been generated between the two devices.

In addition, the communication device and method for generating a beamforming link, according to another exemplary embodiment, may increase a communication performance between the communication device and an external device without performing a beam refinement phase.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A communication device, comprising:
a beamforming link generating unit which generates a first beamforming link between a first antenna of a plurality of antennas of the communication device and an external device, and which is able to generate a second beamforming link between a second antenna of the plurality of antennas of the communication device and the external device; and
a transmission/reception unit which transmits data to the external device via each of the first beamforming link and the second beamforming link, and which is able to receive data,
wherein the transmission/reception unit comprises:
a frame transmitting unit which transmits a sweep frame to the external device via each of a plurality of sectors, wherein each of the plurality of sectors corresponds to a respective one of the plurality of antennas; and
a frame receiving unit which receives a feedback frame from the external device,
wherein the beamforming link generating unit determines the first antenna and one of the plurality of sectors which corresponds to the first antenna and the second antenna and one of the plurality of sectors which corresponds to the second antenna based on information relating to the received feedback frame, and
wherein the beamforming link generating unit generates the first beamforming link using the determined first antenna and the determined sector corresponding to the first antenna, and generates the second beamforming link using the determined second antenna and the determined sector corresponding to the second antenna.

2. The communication device of claim 1, wherein the feedback frame comprises:
an antenna identification field which indicates an identification of an antenna through which the sweep frame received by the external device has been transmitted; and
a sector identification field which indicates an identification of a sector through which the sweep frame has been transmitted.

3. The communication device of claim 2, wherein the feedback frame further comprises information relating to a relative priority of the feedback frame with respect to other feedback frames transmitted to the communication device, and
the beamforming link generator determines the first antenna and the sector corresponding to the first antenna based on feedback frame information which indicates a first priority, and determines the second antenna and the sector corresponding to the second antenna based on feedback frame information which indicates a second priority.

4. A method for generating a beamforming link between a communication device and an external device by using the communication device, the method comprising:
(a) generating a first beamforming link between a first antenna of a plurality of antennas of the communication device and an external device;
(b) generating a second beamforming link between a second antenna of the plurality of antennas of the communication device and the external device; and
(c) transmitting data to the external device via each of the first beamforming link and the second beamforming link,
wherein the generating of the first beamforming link and the second beamforming link comprises:
transmitting a sweep frame to the external device via each of a plurality of sectors, wherein each of the plurality of sectors corresponds to a respective one of the plurality of antennas;
receiving a feedback frame from the external device;
determining the first antenna and one of the plurality of sectors which corresponds to the first antenna and the second antenna and one of the plurality of sectors which corresponds to the second antenna based on information relating to the received feedback frame; and
generating the first beamforming link using the determined first antenna and the determined sector corresponding to the first antenna, and generating the second beamforming link using the determined second antenna and the determined sector corresponding to the second antenna.

5. The method of claim 4, wherein the feedback frame comprises:
an antenna identification field which indicates an identification of an antenna through which the sweep frame received by the external device has been transmitted; and
a sector identification field which indicates an identification of a sector through which the sweep frame has been transmitted.

6. The method of claim 5, wherein the feedback frame further comprises information relating to a relative priority of the feedback frame with respect to other feedback frames transmitted to the communication device, and
the method further comprises determining the first antenna and the sector corresponding to the first antenna based on feedback frame information which indicates a first priority, and determining the second antenna and the sector corresponding to the second antenna based on feedback frame information which indicates a second priority.

7. The communication device of claim 1, further comprising a communication performance determining unit which determines a first performance indicator which indicates a communication performance relating to the first beamforming link, wherein the beamforming link generating unit determines, based on the determined first performance indicator, whether the second beamforming link is generated.

8. The communication device of claim 1, wherein when the second beamforming link is generated, the transmission/reception unit transmits first data to the external device via the first beamforming link and transmits second data to the external device via the second beamforming link.

9. The communication device of claim 1, wherein, if the transmission/reception unit receives a beamforming link generation request from the external device, the beamforming link generating unit generates the second beamforming link.

10. The communication device of claim 7, wherein when the second beamforming link is generated, the communication performance determining unit determines a second performance indicator which indicates a communication performance relating to the second beamforming link, and if a value of the second performance indicator is lower than a pre-set reference value, the transmission/reception unit does not use the second beamforming link.

11. A method for generating a beamforming link between a communication device and an external device by using the communication device, comprising:
- generating a first beamforming link between a first antenna of a plurality of antennas of the communication device and an external device;
- determining a first performance indicator which indicates a communication performance relating to the first beamforming link;
- using the determined first performance indicator to determine whether to generate a second beamforming link;
- generating the second beamforming link between a second antenna of the plurality of antennas of the communication device and the external device if a positive determination to generate the second beamforming link is made; and
- transmitting data to the external device via at least one of the first beamforming link and the second beamforming link,
- wherein the generating of the first beamforming link and the second beamforming link comprises:
  - transmitting a sweep frame to the external device via each of a plurality of sectors, wherein each of the plurality of sectors corresponds to a respective one of the plurality of antennas;
  - receiving a feedback frame from the external device;
  - determining the first antenna and one of the plurality of sectors which corresponds to the first antenna and the second antenna and one of the plurality of sectors which corresponds to the second antenna based on information relating to the received feedback frame; and
  - generating the first beamforming link using the determined first antenna and the determined sector corresponding to the first antenna, and generating the second beamforming link using the determined second antenna and the determined sector corresponding to the second antenna.

12. The method of claim 4, wherein the transmitting data to the external device comprises transmitting first data to the external device via the first beamforming link and transmitting second data to the external device via the second beamforming link.

13. The method of claim 4, further comprising receiving a beamforming link generation request from the external device.

14. The method of claim 11, further comprising when the second beamforming link is generated, determining a second performance indicator which indicates a communication performance relating to the second beamforming link, and if a value of the second performance indicator is lower than a pre-set reference value, not using the second beamforming link to transmit data.

15. A non-transitory computer-readable recording medium which stores a computer-readable program for executing the method of claim 4.

* * * * *